H. A. RICHARDS.
Fire Escapes.
No. 137,483.            Patented April 1, 1873.
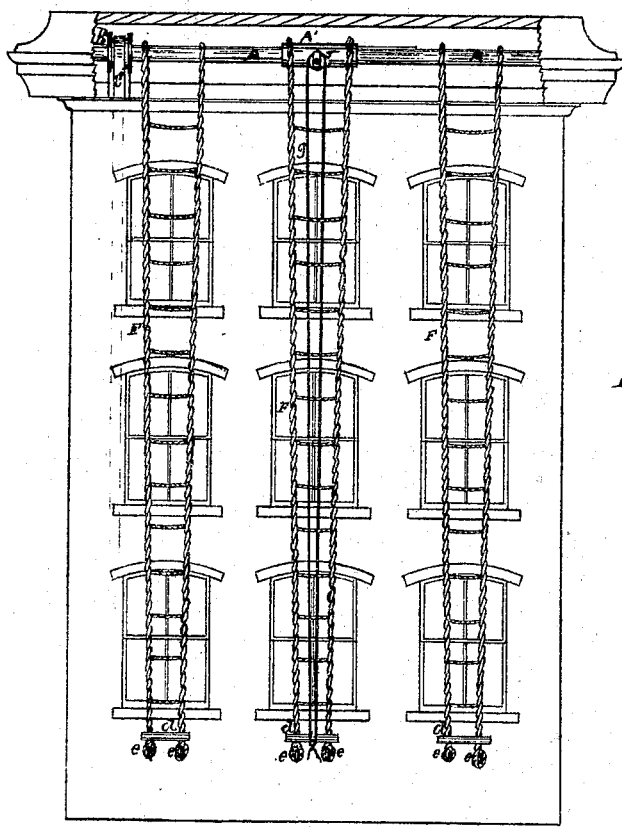
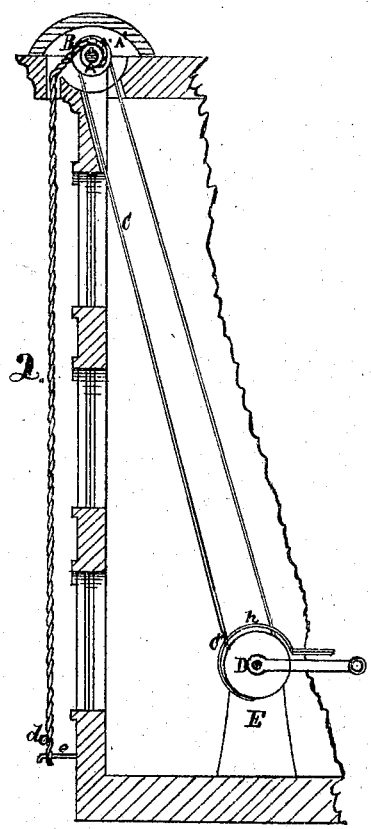
Witnesses
N. H. Sherburne
N. C. Gridley
Inventor
Henry A. Richards

UNITED STATES PATENT OFFICE.

HENRY A. RICHARDS, OF CHICAGO, ILLINOIS.

IMPROVEMENT IN FIRE-ESCAPES.

Specification forming part of Letters Patent No. 137,483, dated April 1, 1873; application filed January 24, 1871.

*To all whom it may concern:*

Be it known that I, HENRY A. RICHARDS, of Chicago, county of Cook and State of Illinois, have invented a new, useful, and Improved Fire-Escape; and I do hereby declare the following to be a full, clear, and exact description thereof, which will enable others skilled in the art to make and use the same, reference being had to the accompanying drawing forming part of this specification, in which—

Figure 1 is a front elevation of a building with my invention attached thereto; and Fig. 2 is a vertical transverse section of the building, showing a side elevation of my invention.

Similar letters of reference indicate corresponding parts in the several figures of the drawing.

My invention relates to fire-escape ladders which are attached to a windlass or shaft secured within or below the cornice, upon and around which shaft the ladders are wound by suitable machinery secured upon the ground or within the building; the said shaft being so arranged as to allow the ladders to unwind by their own weight and descend to the ground when the restraining-brake is removed.

In the drawing, A represents the shaft upon which the ladders are supported. This shaft is properly secured within suitable boxes affixed to the side of the building within or below the cornice, and is so arranged as to admit of a rotating movement. Attached to one end of said shaft is a wheel, B, around and over which passes a belt, C, extending downward to or near the ground or lower floor of the building, passing around wheel C' secured on shaft D, said shaft being supported in frame E, which is affixed to the floor or side of the building. Affixed to shaft A is a series of ladders, F, which extend downward to or near the ground, and are each provided near their lower end with a metal weight, d, firmly secured thereto. The lower ends of each side of said ladders are provided with a loop, through which pass hooks e, firmly attached to the walls of the building, by which the same are secured in position when lowered to the ground. Upon said shaft A is a sleeve, A', which is so arranged as to revolve with the shaft, and also capable of being moved thereon in the direction of its length. To this sleeve is attached a ladder, F', the object of which is to allow the same to be moved laterally to either side of the window. The said ladders may be of any suitable material which will admit of being wound around the shaft. Attached to said sleeve is a sheave-wheel, J, over which passes a rope or chain, g, extending downward to the lower end of the ladder, and is so arranged as to be wound around said sleeve together with the ladder. The objects of the sheave and rope are to raise the hose to any window in the building or to lower articles therefrom. Attached to frame E is a pawl or restraining-brake, h, which engages the periphery of wheel C' on shaft D, by which the ladders are secured at any desired point. When it is found desirable to continue the ladders on all sides of the building, bevel-gear wheels may be attached to the ends of the shaft, by which a rotary motion is communicated from one to the other. I have stated that I use a belt passing around a wheel on shaft, A by which motion is communicated thereto, which may be as described; or a vertical shaft with suitable gear-wheels may be used.

The operation of my invention is as follows: The ladders being wound around shaft A, should a fire start in the lower portion of the building which prevents the occupants of the upper portion from descending the stairs, the pawl or restraining-brake h is removed from wheel C', which allows the ladders to unwind and descend to the ground in front of the windows, thus giving the occupants of the building a safe and reliable means of escape.

Having thus described my invention, what I claim as new, and desire to secure by Letters Patent, is—

In combination with shaft A and the mechanism B C C' and D for rotating said shaft, the reciprocating sleeve A', arranged to rotate with said shaft, wheel J, rope g, and ladders F and F', as specified.

The above specification of my invention signed by me this 31st day of December, A. D. 1870.

HENRY A. RICHARDS.

Witnesses:
 N. C. GRIDLEY,
 N. H. SHERBURNE.